US00RE36519E

United States Patent [19]

Lum et al.

[11] E Patent Number: Re. 36,519

[45] Reissued Date of Patent: Jan. 18, 2000

[54] PLASTICIZERS FOR DYE-DONOR ELEMENT USED IN THERMAL DYE TRANSFER

[75] Inventors: Kin Kwong Lum, Webster; Christine J. T. Landry, Fairport; Teh-Ming Kung, Rochester, all of N.Y.

[73] Assignee: Eastman Kodak Company, Rochester, N.Y.

[21] Appl. No.: 09/298,096

[22] Filed: Apr. 22, 1999

Related U.S. Patent Documents

Reissue of:

[64] Patent No.: 5,750,465
Issued: May 12, 1998
Appl. No.: 08/670,312
Filed: Jun. 27, 1996

[51] Int. Cl.[7] ..... B41M 5/035; B41M 5/38

[52] U.S. Cl. ..... 503/227; 428/195; 428/913; 428/914

[58] Field of Search ..... 8/471; 428/195, 428/913, 914; 503/227

[56] References Cited

U.S. PATENT DOCUMENTS 4,440,590 4/1984 Collins et al. ..... 156/234

4,876,236 10/1989 Vanier et al. ..... 503/227

FOREIGN PATENT DOCUMENTS

2/151485 6/1990 Japan ..... 503/227

*Primary Examiner*—Bruce H. Hess
*Attorney, Agent, or Firm*—Harold E. Cole

[57] ABSTRACT

This invention relates to a dye-donor element for *resistive head* thermal dye transfer comprising a support having thereon a dye layer comprising an image dye in a polymeric binder, and wherein the dye layer also contains a polymeric plasticizer having a Tg less than about 25° C., the plasticizer comprising

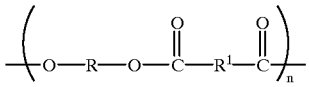

wherein:

R and $R^1$ each independently represent a substituted or unsubstituted linear or branched alkylene, phenylene or cycloalkylene group of from 1 to about 12 carbon atoms; and n is an integer selected so that the plasticizer has a polystyrene equivalent weight average molecular weight of from about 18,000 to about 300,000.

15 Claims, No Drawings

PLASTICIZERS FOR DYE-DONOR ELEMENT USED IN THERMAL DYE TRANSFER

Matter enclosed in heavy brackets [ ] appears in the original patent but forms no part of this reissue specification; matter printed in italics indicates the additions made by reissue.

*This application is a reissue application for U.S. Pat. No. 5,750,465 issued May 12, 1998 on U.S. Ser. No. 08/670,312 filed Jun. 27, 1996.*

This invention relates to the use of certain polymeric plasticizers in dye-donor elements for thermal dye transfer systems.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other two colors. A color hard copy is thus obtained which corresponds to the original picture viewed on a screen. Further details of this process and an apparatus for carrying it out are contained in U.S. Pat. No. 4,621,271, the disclosure of which is hereby incorporated by reference.

An important requirement for any thermal dye-donor element is to maintain performance over its useful lifetime without degradation in the quality of the image. The dye layer of a dye-donor element for resistive head thermal dye transfer generally comprises a polymeric binder and diffusible dyes. The percentage of dye in the layer is typically quite high, in the range of 20 to 80%. The dye is usually dissolved in the binder or phase-separated into small domains. During keeping of the dye-donor, the temperature and humidity may be elevated. The dyes in the dye layer, which is in contact with a slipping layer coated on the back side of the dye-donor element when it is wound up in spool form, sometimes become crystallized. Some plasticizers have been proposed in the prior art to be added to such dye-donor elements such as phenol-formaldehyde condensates, or phenolic resins, such as novolacs and resoles. While these materials do not cause the dyes in the dye-donor element to crystallize, they do not enhance dye transfer efficiency, and if used in too great an amount can cause a reduction in dye transfer efficiency.

U.S. Pat. No. 4,876,236 relates to the use of nonpolymeric materials or compounds as plasticizers for a dye-donor element. JP 2/151485 also relates to the use of plasticizers in a dye-donor element which includes some polymeric compounds such as polyethylene glycol esters and polyester adipate. However, there is a problem with these prior art plasticizers in that they tend to cause crystallization in the dye-donor element with subsequent loss of dye density. Further, there is a problem with these prior art plasticizers in that variations in printing density occur when the dye-donors are aged at elevated temperatures.

It is an object of this invention to provide a plasticizer for a dye-donor element in which sensitometric changes upon storage and keeping a minimized and dye efficiency during printing is maintained or improved. It is another object of this invention to provide a plasticizer for a dye-donor element which reduces the tendency of the dye to crystallize.

These and other objects are achieved in accordance with this invention which relates to a dye-donor element for thermal dye transfer comprising a support having thereon a dye layer comprising an image dye in a polymeric binder, and wherein the dye layer also contains a polymeric plasticizer having a Tg less than about 25° C., the plasticizer comprising

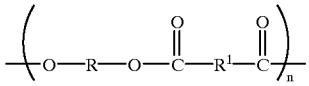

wherein:

R and $R^1$ each independently represent a substituted or unsubstituted linear or branched alkylene, phenylene or cycloalkylene group of from 1 to about 12 carbon atoms, such as methylene, ethylene, propylene, butylene, isopropylene, t-butylene, pentylene, hexamethylene, cyclohexylene, cyclohexane dimethylene, cyclobutylene, cyclopentylene, etc; and n is an integer selected so that the plasticizer has a polystyrene equivalent weight average molecular weight of from about 18,000 to about 300,000.

Plasticizers included within the scope of the invention include the following:

P-1

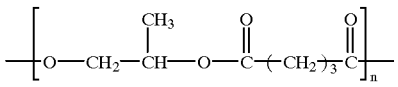

where n is such that the polystyrene equivalent weight average molecular weight for the polymer is about 27,000. This material is described as a polyester sebacate and is available commercially as Paraplex® G-25 from C. P. Hall Co.

P-2

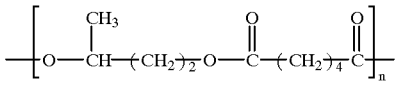

where n is such that the polystyrene equivalent weight average molecular weight for the polymer is about 20,000.

P-3

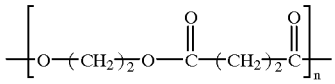

where n is such that the polystyrene equivalent weight average molecular weight for the polymer is about 18000. This material is described as a poly(ethylene succinate).

P-4

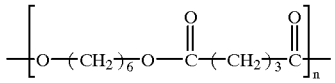

where n is such that the polystyrene equivalent weight average molecular weight for the polymer is about 35,000. This material is described as a poly(hexamethylene sebacate).

P-5

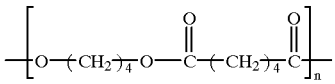

where n is such that the polystyrene equivalent weight average molecular weight for the polymer is about 25,000. This material is described as a poly(butylene adipate).

In a preferred embodiment of the invention, R is —($CH_2$) —CH(CH3)—. In another preferred embodiment, $R^1$ is —$(CH_2)_8$—. In still another preferred embodiment, the polystyrene equivalent weight average molecular weight of the plasticizer is about 27,000. In yet another preferred embodiment, the plasticizer is present at a concentration of from about 5 to about 25% by weight of the dye layer.

By using the plasticizers of the present invention in dye-donor elements, a reduction in sensitometric changes upon keeping occurs along with minimization of crystallization of the dyes.

Any dye can be used in the dye-donor employed in the invention provided it is transferable to the dye-receiving layer by the action of heat. Especially good results have been obtained with sublimable dyes such as anthraquinone dyes, e.g., Sumikalon Violet RS® (product of Sumitomo Chemical Co., Ltd.), Dianix Fast Violet 3R-FS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumicacryl Blue 6G® (product of Sumitomo Chemical Co., Ltd.), and Aizen Malachite Green® (product of Hodogaya Chemical Co., Ltd.);

M-1

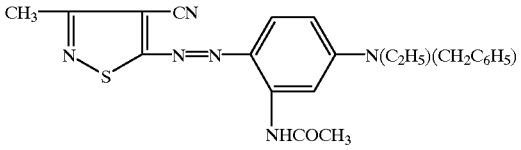

(magenta)

-continued

M-2

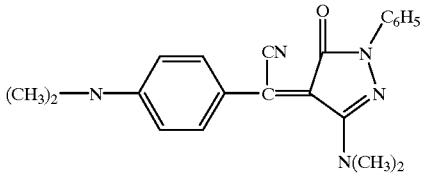

(magenta)

M-3

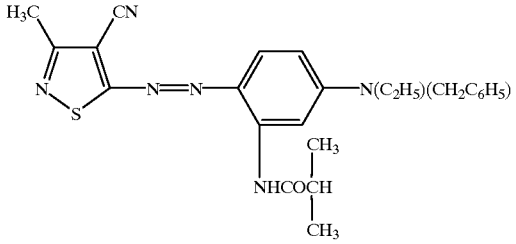

(magenta)

M-4

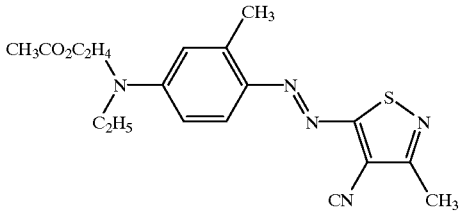

(magenta)

C-1

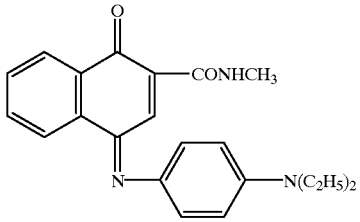

(cyan)

C-2

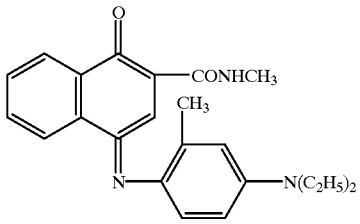

(cyan)

-continued

C-3

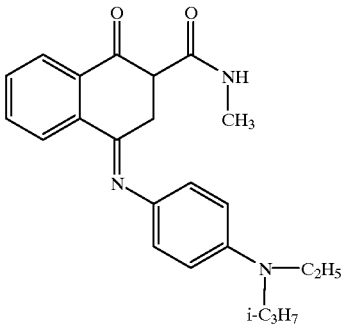

(cyan)

Y-1

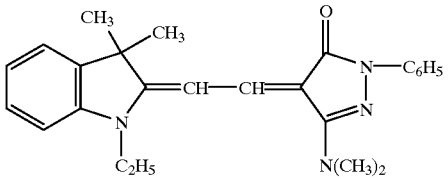

(yellow)

Y-2

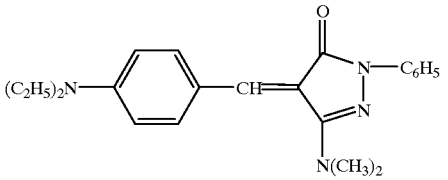

(yellow)

or any of the dyes disclosed in U.S. Pat. Nos. 4,541,830, 4,698,651, 4,695,287, 4,301,439, 4,757,046, 4,743,582, 4,769,360, and 4,353,922, the disclosures of which are hereby incorporated by reference. The above dyes may be employed singly or in combination. The dyes may be used at a coverage of from about 0.05 to about 1 g/m$^2$ and are preferably hydrophobic.

A dye-barrier layer may be employed in the dye-donor elements of the invention to improve the density of the transferred dye. Such dye-barrier layer materials include hydrophilic materials such as those described and claimed in U.S. Pat. No. 4,716,144.

The dye layer of the dye-donor element may be coated on the support or printed thereon by a printing technique such as a gravure process.

Any material can be used as the support for the dye-donor element of the invention provided it is dimensionally stable and can withstand the heat of the thermal head. Such materials include polyesters such as poly(ethylene terephthalate); polyamides; polycarbonates; cellulose esters such as cellulose acetate; fluorine polymers such as polyvinylidene fluoride or poly(tetrafluoroethylene-co-hexafluoropropylene); polyethers such as polyoxymethylene; polyacetals, polyolefins such as polystyrene, polyethylene, polypropylene or methylpentene polymers; and polyimides such as polyimide-amides and polyetherimides. The support generally has a thickness of from about 5 to about 200 mm. It may also be coated with a subbing layer, if desired, such as those materials described in U.S. Pat. No. 4,695,288 or 4,737,486.

The dye in the dye-donor element of the invention is dispersed in a polymeric binder such as a cellulose derivative, e.g., cellulose acetate hydrogen phthalate, cellulose acetate, cellulose acetate propionate, cellulose acetate butyrate, cellulose triacetate or any of the materials described in U.S. Pat. No. 4,700,207; a polycarbonate; polyvinyl acetate, poly(styrene-co-acrylonitrile), a poly (sulfone) or a poly(phenylene oxide). The binder may be used at a coverage of from about 0.1 to about 5 g/m$^2$.

The reverse side of the dye-donor element may be coated with a slipping layer to prevent the printing head from sticking to the dye-donor element. Such a slipping layer would comprise either a solid or liquid lubricating material or mixtures thereof, with or without a polymeric binder or a surface active agent. Preferred lubricating materials include oils or semi-crystalline organic solids that melt below 100° C. such as poly(vinyl stearate), beeswax, perfluorinated alkyl ester polyethers, poly(caprolactone), silicone oil, poly (tetrafluoroethylene), carbowax, poly(ethylene glycols), or any of those materials disclosed in U.S. Pat. Nos. 4,717,711; 4,717,712; 4,737,485; and 4,738,950. Suitable polymeric binders for the slipping layer include poly(vinyl alcohol-co-butyral), poly(vinyl alcohol-co-acetal), poly(styrene), poly (vinyl acetate), cellulose acetate butyrate, celllullose acetate propionate, cellulose acetate or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.05 to 50 weight %, preferably 0.5 to 40, of the polymeric binder employed.

The dye-receiving element that is used with the dye-donor element of the invention usually comprises a support having thereon a dye image-receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, an ivory paper, a condenser paper or a synthetic paper such as DuPont Tyvek®. Pigmented supports such as white polyester (transparent polyester with white pigment incorporated therein) may also be used.

The dye image-receiving layer may comprise, for example, a polycarbonate, a polyurethane, a polyester, polyvinyl chloride, poly(styrene-co-acrylonitrile), poly (caprolactone), a poly(vinyl acetal) such as poly(vinyl alcohol-co-butyral), poly(vinyl alcohol-co-benzal), poly (vinyl alcohol-co-acetal) or mixtures thereof. The dye image-receiving layer may be present in any amount which is effective for the intended purpose. In general, good results have been obtained at a concentration of from about 1 to about 5 g/m$^2$.

As noted above, the dye-donor elements of the invention are used to form a dye transfer image. Such a process comprises imagewise heating a dye-donor element as described above and transferring a dye image to a dye-receiving element to form the dye transfer image.

The dye-donor element of the invention may be used in sheet form or in a continuous roll or ribbon. If a continuous roll or ribbon is employed, it may have alternating areas of dyes such as sublimable cyan and/or magenta and/or yellow and/or black or other dyes. Thus, one, two-, three- or four-color elements (or higher numbers also) are included within the scope of the invention.

In a preferred embodiment of the invention, the dye-donor element comprises a poly(ethylene terephthalate) support coated with sequential repeating areas of cyan, yellow and magenta, and the above process steps are sequentially performed for each color to obtain a three-color dye transfer image. Of course, when the process is only performed for a single color, then a monochrome dye transfer image is obtained.

Thermal printing heads which can be used to transfer dye from the dye-donor elements of the invention are available commercially. There can be employed, for example, a Fujitsu Thermal Head (FTP-040 MCSOO1), a TDK Thermal Head F415 HH7-1089 or a Rohm Thermal Head KE 2008-F3.

A thermal dye transfer assemblage of the invention comprises a) a dye-donor element as described above, and b) a dye-receiving element as described above, the dye-receiving element being in a superposed relationship with the dye-donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed three times using different dye-donor elements. After the first dye is transferred, the elements are peeled apart. A second dye-donor element (or another area of the donor element with a different dye area) is then brought in register with the dye-receiving element and the process repeated. The third color is obtained in the same manner.

The following examples are provided to illustrate the invention:

EXAMPLE 1

The following control plasticizers were employed in the examples:

TABLE 1

| Plasticizer | Material/Supplier | Mol. Wt.* |
|---|---|---|
| C-1 | 1,4-methoxy-2,5-decanoxy-benzene | 450 |
| C-2 | didodecyl phthalate (See U.S. Pat. No. 4,876,236, column 12) | 318 |
| C-3 | poly(ethylene glycol benzoate) (Scientific Polymer Products) | 403 |
| C-4 | polyester adipate (C. P. Hall Co.) | 3350 |
| C-5 | polyester adipate (D-643 from Mitsubishi Kasei KK, see Ex. 1 of JP 2/151485) | 4480 |
| C-6 | polyester adipate (Witco Corp.) | 2070 |
| C-7 | polyester adipate (Witco Corp.) | 4810 |
| C-8 | polyester adipate (C. P. Hall Corp.) | 16,000 |

*polystyrene equivalent weight average molecular weight

Preparation of Magenta Dye-Donor Element of the Invention

A dye-donor element was prepared by gravure coating a subbing layer of 0.11 g/m$^2$ of titanium tetrabutoxide, Tyzor TBT® (DuPont Co.) in a propyl acetate/butanol (85:15) solvent mixture onto both sides of a 6 $\mu$m poly(ethylene terephthalate) support (DuPont Co.) On one side of this support was coated the following dye layer:

| | |
|---|---|
| 0.30 g/m$^2$ | CAP 482-20 (cellulose acetate propionate) 20 s viscosity (Eastman Chemical Co.) |
| 0.16 g/m$^2$ | M-1 dye |
| 0.18 g/m$^2$ | M-2 dye |

-continued

| | |
|---|---|
| 0.03 g/m$^2$ | 2,4,6-trimethylanilide of phenyl-indane-diacid |
| 0.001 g/m$^2$ | Fluorad FC-430 ® (a fluorosurfactant from 3M Corp.) |
| 0.006 g/m$^2$ | divinylbenzene beads (2 $\mu$m) |
| 9.06 g/m$^2$ | P-1 polyester |

On the other side of the above support was coated the following slipping layer:

| | |
|---|---|
| 0.39 g/m$^2$ | poly(vinyl acetal (KS-1 from Sekisui America Corp.) |
| 0.02 g/m$^2$ | candelilla wax |
| 0.01 g/m$^2$ | PS-513 (an aminopropyl dimethyl-terminated polydimethylsiloxane from Petrarch Systems, Inc.) |
| 0.0003 g/m$^2$ | p-toluenesulfonic acid |

Preparation of Control Magenta Dye-Donor Element

For comparison, a control dye-donor element was prepared in the same manner as above except the P-1 polyester plasticizer in the dye-donor layer was omitted.

Preparation of Receiver Element

A dye-receiving element base was prepared employing a support laminated to a packaging film. The support consisted of a paper stock from a blend of Pontiac Maple 51 (a bleached maple hardwood kraft of 0.5 $\mu$m length weighted average fiber length) available from Consolidated Pontiac, Inc. and Alpha Hardwood Sulfite (a bleached red-alder hardwood sulfite pulp of 0.69 $\mu$m average fiber length) available from Weyerhauser Paper Co. This support had a microvoided packaging film of OPPalyte® 350 TWK, polypropylene-laminated paper support with a lightly $TiO_2$-pigmented polypropylene skin (Mobil Chemical Co.) at a dry coverage of 0.11 g/m$^2$, 36 $\mu$m thick, laminated on the imaging side. Prior to coating, the support was subjected to a corona discharge treatment at approximately 450 joules/m$^2$.

A thermal dye-transfer receiving element was prepared from the above receiver support by coating the following layers in order on the top surface of the microvoided packaging film:

a) a subbing layer of Prosil® 221 and Prosil® 2210 (PCR, Inc.) (1:1 weight ratio) both are organo-oxysilanes, in an ethanol-methanol-water solvent mixture. The resultant solution (0.10 g/m$^2$) contained approximately 1% of silane component, 1% water, and 98% of 3A alcohol;

b) a dye-receiving layer containing Makrolon® KL3-1013 (a polyether-modified bisphenol-A polycarbonate block copolymer) (Bayer AG) (1.78 g/m$^2$), GE Lexan® 141-112 (a bispenol-A polycarbonate) (General Electric Co.) (1.46 g/m$^2$), Fluorad® FC-431 (perfluorinated alkylsulfonamidoalkyl ester surfactant) (3M Co.) (0.01 g/m$^2$), di-n-butyl phthalate (0.32 g/m$^2$), and diphenyl phthalate (0.32 g/m$^2$) and coated from a solvent mixture of methylene chloride and trichloroethylene (4:1 by weight) (4.1% solids); and c) a dye-receiver overcoat containing a solvent mixture of methylene chloride and trichloroethylene, terpolymer of bisphenol A polycarbonate, diethylene glycol and polydimethylsiloxane (0.65 g/m$^2$), and surfactants DC-510 Silicone Fluid (Dow-Corning Corp.) (0.008 g/m$^2$) and Fluorad® FC-431 (3M Co.) (0.02 g/m$^2$) from dichloromethane.

Printing Conditions

Assemblies of the dye-donor and dye-receiver test elements as prepared above were subjected to thermal printing in a printer equipped with a TDK thermal print head Model No. LV5416 which had a resolution of 118 dots/cm and an average resistance of 3281 Ω. The printing speed was 5 ms per line. The head voltage was set at 13.75 v to provide a maximum print energy of approximately 5 joule/cm$^2$ at 36.4° C. A step tablet was used to generate test strips with Status A reflection densities (measured with an X-Rite densitometer, X-Rite Corp., Grandville, Mich.) as follows:

TABLE 2

| | STATUS A REFLECTION DENSITY | |
|---|---|---|
| Step # | Element with Plasticizer P-1 | Control Element w/o Plasticizer |
| 1 | 2.55 | 2.36 |
| 3 | 1.31 | 1.03 |
| 5 | 0.56 | 0.37 |
| 7 | 0.26 | 0.10 |
| 9 | 0.07 | 0.06 |
| 10 | 0.06 | 0.06 |

The above results show that increased density is obtained by using the plasticizers in a dye-donor element according to the invention.

Several other control plasticizers were tested in the same manner as above, including two monomeric plasticizers (C-1 and C-2) and six polymeric plasticizers of various molecular weights (C-3–C-8). The following results were obtained:

TABLE 3

| | STATUS A REFLECTION DENSITY | | | | | | | |
|---|---|---|---|---|---|---|---|---|
| Step | C-1 | C-2 | C-3 | C-4 | C-5 | C-6 | C-7 | C-8 |
| 1 | 2.53 | 2.56 | 2.61 | 2.55 | 2.56 | 2.59 | 2.55 | 2.55 |
| 3 | 1.24 | 1.30 | 1.29 | 1.33 | 1.30 | 1.31 | 1.30 | 1.21 |
| 5 | 0.52 | 0.56 | 0.53 | 0.57 | 0.55 | 0.54 | 0.55 | 0.46 |
| 7 | 0.24 | 0.27 | 0.26 | 0.27 | 0.26 | 0.27 | 0.27 | 0.18 |
| 9 | 0.08 | 0.07 | 0.07 | 0.07 | 0.07 | 0.07 | 0.07 | 0.06 |
| 10 | 0.07 | 0.06 | 0.06 | 0.06 | 0.06 | 0.05 | 0.06 | 0.06 |

The above results show that the polymeric plasticizers had a similar effect of increasing dye transfer efficiency as that observed with monomeric plasticizers. The molecular weight of the respective polymers had only a slight effect on dye transfer efficiency. However, the control polymeric plasticizers had other problems as shown below.

EXAMPLE 2

In order to evaluate the shelf keeping stability of the dye-donor elements with respect to dye crystallization and densitometric response, each dye-donor element was wound on a plastic spool which was then placed into an aluminum-line bag and sealed The bag was kept in an oven of 40° C. for nine days to simulate a longer term of shelf keeping at ambient conditions or harsh conditions during shipping. The elements were then examined for dye crystallization. The following results were obtained:

TABLE 4

| ELEMENT WITH PLASTICIZER IN DYE LAYER | DYE CRYSTALLIZATION Yes or No |
|---|---|
| None | No |
| C-1 | Yes |
| C-2 | Yes |
| C-3 | Yes |

TABLE 4-continued

| ELEMENT WITH PLASTICIZER IN DYE LAYER | DYE CRYSTALLIZATION Yes or No |
|---|---|
| C-4 | Yes |
| C-5 | Yes |
| C-6 | Yes |
| C-7 | Yes |
| C-8 | Yes |
| P-1 | No |

The above results show that both the molecular and polymeric plasticizers (C-1–C-8) having a polystyrene equivalent weight average molecular weight of less than 18,000 increase the propensity of dye crystallization on long term keeping or temporary storage at high temperature. Only the element with no plasticizer and the element containing the plasticizer according to the invention had no crystallization.

EXAMPLE 3

The elements of Example 1, with and without plasticizer P-1, were measured for densitometric responses before and after keeping for 9 days at 38° C. The following results were obtained:

TABLE 5

| | STATUS A REFLECTION DENSITY | | | |
|---|---|---|---|---|
| | Control Element w/o Plasticizer | | Element with plasticizer P-1 | |
| Step # | ambient | 9 days at 38° C. | ambient | 9 days at 38° C. |
| 1 | 2.36 | 2.29 | 2.55 | 2.56 |
| 3 | 1.03 | 1.00 | 1.31 | 1.33 |
| 5 | 0.37 | 0.35 | 0.56 | 0.58 |
| 6 | 0.25 | 0.21 | 0.43 | 0.45 |
| 7 | 0.10 | 0.10 | 0.26 | 0.25 |
| 9 | 0.06 | 0.06 | 0.07 | 0.07 |

The above results show that the change upon elevated keeping observed with the element containing plasticizer P-1 in the dye layer is significantly reduced as compared to the control element with no plasticizer.

EXAMPLE 4

Preparation of Control Yellow Dye-Donor Element

A dye-donor element was prepared similar to Example 1 using the same slipping layer on the back and the following dye layer on the front:

| | |
|---|---|
| 0.26 g/m$^2$ | CAP 482-20 (cellulose acetate propionate) 20 s viscosity (Eastman Chemical Co.) |
| 0.13 g/m$^2$ | CAP 482-0.5 (cellulose acetate propionate) 0.5 s viscosity (Eastman Chemical Co.) |
| 0.11 g/m$^2$ | Y-1 dye |
| 0.13 g/m$^2$ | Y-2 dye |
| 0.001 g/m$^2$ | Fluorad FC-430 ® (a fluorosurfactant from 3M Corp.) |
| 0.006 g/m$^2$ | divinylbenzene beads (2 μm) |

Preparation of Yellow Dye-Donor Element of the Invention

A dye-donor element was prepared in the same manner as the control yellow dye-donor above except the P-1 polyester plasticizer (0.06 g/m$^2$) in the dye layer was added.

Preparation of Control Cyan Dye-Donor Element

A dye-donor element was prepared similar to Example 1 using the same slipping layer on the back and the following dye layer on the front:

| | |
|---|---|
| 0.29 g/m$^2$ | CAP 482-20 (cellulose acetate propionate) 20 s viscosity (Eastman Chemical Co.) |
| 0.05 g/m$^2$ | C-1 dye |
| 0.13 g/m$^2$ | C-2 dye |
| 0.32 g/m$^2$ | C-3 dye |
| 0.04 g/m$^2$ | 2,4,6-trimethylanilide of phenyl-indane-diacid |
| 0.001 g/m$^2$ | Fluorad FC-430 ® (a fluorosurfactant from 3M Corp.) |
| 0.005 g/m$^2$ | divinylbenzene beads (2 $\mu$m) |

Preparation of Cyan Dye-Donor Element of the Invention

A dye-donor element was prepared in the same manner as the control cyan dye-donor above except the P-1 polyester plasticizer (0.03 g/m$^2$) in the dye layer was added.

Status A reflection densities for these dye-donor elements were obtained with the receiver as in Example 1. The following results were obtained:

TABLE 6

| | STATUS A REFLECTION DENSITY | | | |
|---|---|---|---|---|
| | Yellow Dye-donor | | Cyan Dye-donor | |
| Step # | without P-1 | with P-1 | without P-1 | with P-1 |
| 1 | 2.09 | 2.26 | 2.05 | 2.15 |
| 3 | 1.06 | 1.33 | 0.96 | 1.07 |
| 5 | 0.44 | 0.62 | 0.33 | 0.41 |
| 7 | 0.16 | 0.32 | 0.11 | 0.17 |
| 9 | 0.07 | 0.09 | 0.06 | 0.06 |
| 10 | 0.06 | 0.06 | 0.06 | 0.06 |

The above results show that the addition of the polymeric plasticizer according to the invention significantly improved the density. In addition, none of these dye-donors exhibited any crystal formation.

EXAMPLE 5

The elements of Example 4, with and without plasticizer P-1, were measured for densitometric responses before and after keeping for 9 days at 380° C. The following results were obtained:

TABLE 7

| Yellow Dye-Donor | | | | |
|---|---|---|---|---|
| | STATUS A REFLECTION DENSITY | | | |
| | Control Element w/o Plasticizer | | Element with Plasticizer P-1 | |
| Step # | ambient | 9 days at 38° C. | ambient | 9 days at 38° C. |
| 1 | 2.09 | 2.08 | 2.26 | 2.24 |
| 3 | 1.06 | 1.02 | 1.33 | 1.32 |
| 5 | 0.44 | 0.41 | 0.62 | 0.62 |
| 6 | 0.33 | 0.28 | 0.50 | 0.49 |
| 7 | 0.16 | 0.14 | 0.32 | 0.31 |
| 9 | 0.07 | 0.07 | 0.09 | 0.08 |

TABLE 8

| Cyan Dye-Donor | | | | |
|---|---|---|---|---|
| | STATUS A REFLECTION DENSITY | | | |
| | Control Element w/o Plasticizer | | Element with Plasticizer P-1 | |
| Step # | ambient | 9 days at 38° C. | ambient | 9 days at 38° C. |
| 1 | 2.05 | 2.08 | 2.15 | 2.12 |
| 3 | 0.96 | 0.99 | 1.07 | 1.06 |
| 5 | 0.32 | 0.34 | 0.41 | 0.42 |
| 6 | 0.24 | 0.24 | 0.31 | 0.31 |
| 7 | 0.11 | 0.11 | 0.17 | 0.17 |
| 9 | 0.06 | 0.06 | 0.06 | 0.06 |

The above results show that the change upon elevated keeping observed with the element containing plasticizer P-1 in the dye layer is significantly reduced as compared to the control element with no plasticizer. In addition, none of these dye-donors exhibited any crystal formation.

The invention has been described in detail with particular reference to preferred embodiments thereof, but it will be understood that variations and modifications can be effected within the spirit and scope of the invention.

What is claimed is:

1. A dye-donor element for *resistive head* thermal dye transfer comprising a support having thereon a dye layer comprising an image dye in a polymeric binder, said dye layer also containing a polymeric plasticizer having a Tg less than about 25° C., said plasticizer comprising

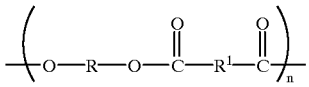

wherein:

R and $R^1$ each independently represent a substituted or unsubstituted linear or branched alkylene, phenylene or cycloalkylene group of from 1 to about 12 carbon atoms; and n is an integer selected so that the plasticizer has a polystyrene equivalent weight average molecular weight of from about 18,000 to about 300,000.

2. The element of claim 1 wherein said plasticizer is present at a concentration of from about 2 to about 25% by weight of said dye layer.

3. The element of claim 1 wherein R is —($CH_2$)—CH (CH3)—.

4. The element of claim 1 wherein $R^1$ is —$(CH_2)_8$—.

5. The element of claim 1 wherein the polystyrene equivalent weight average molecular weight of said plasticizer is about 27,000.

6. A process of forming a dye transfer image comprising:

a) imagewise-heating *by means of a resistive head* a dye-donor element comprising a support having thereon a dye layer comprising a dye dispersed in a binder, and b) transferring a dye image to a dye-receiving element to form said dye transfer image, wherein said dye layer also contains a polymeric plasticizer having a Tg less than about 25° C., said plasticzer comprising

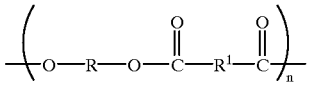

wherein:

R and $R^1$ each independently represent a substituted or unsubstituted linear or branched alkylene, phenylene or cycloalkylene group of from 1 to about 12 carbon atoms; and n is an integer selected so that the plasticizer has a polystyrene equivalent weight average molecular weight of from about 18,000 to about 300,000.

7. The process of claim 6 where said plasticizer is present at a concentration of from about 2 to about 25% by weight of said dye layer.

8. The process of claim 6 wherein R is —$(CH_2)$—CH(CH3)—.

9. The process of claim 6 wherein $R^1$ —$(CH_2)_8$—.

10. The process of claim 6 wherein the polystyrene equivalent weight average molecular weight of said plasticizer is about 27,000.

11. A *resistive head* thermal dye transfer assemblage comprising:

a) a dye-donor element comprising a support having thereon a dye layer comprising an image dye dispersed in a polymeric binder, and b) a dye-receiving element comprising a support having thereon a dye image-receiving layer, said dye-receiving element being in superposed relationship with said dye-donor element so that said dye layer is in contact with said dye image-receiving layer, wherein said dye layer also contains a polymeric plasticizer having a Tg less than about 25° C., said plasticizer comprising

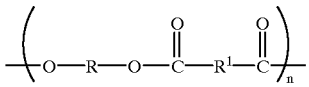

wherein:

R and $R^1$ each independently represent a substituted or unsubstituted linear or branched alkylene, phenylene or cycloalkylene group of from 1 to about 12 carbon atoms; and n is an integer selected so that the plasticizer has a polystyrene equivalent weight average molecular weight of from about 18,000 to about 300,000.

12. The assemblage of claim 11 wherein said plasticizer is present at a concentration of from about 2 to about 25% by weight of said dye layer.

13. The assemblage of claim 11 wherein R is —$(CH_2)$—CH(CH3)—.

14. The assemblage of claim 11 wherein $R^1$ is —$(CH_2)_8$—.

15. The assemblage of claim 11 wherein the polystyrene equivalent weight average molecular weight of said plasticizer is about 27,000.

* * * * *